(12) United States Patent
Mezger et al.

(10) Patent No.: US 7,389,681 B2
(45) Date of Patent: Jun. 24, 2008

(54) METHOD FOR MONITORING A CAMSHAFT ADJUSTMENT OF AN INTERNAL COMBUSTION ENGINE

(75) Inventors: Werner Mezger, Eberstadt (DE); Oliver Krannich, Tamm (DE); Lutz Reuschenbach, Stuttgart (DE); Alex Grossmann, Gernsbach (DE); Ralf Buehrle, Leonberg (DE); Torsten Baumann, Eppingen-Adelshofen (DE)

(73) Assignee: Robert Bosch GmbH, Stuttgart (DE)

( * ) Notice: Subject to any disclaimer, the term of this patent is extended or adjusted under 35 U.S.C. 154(b) by 206 days.

(21) Appl. No.: 10/933,626

(22) Filed: Sep. 3, 2004

(65) Prior Publication Data
US 2005/0061272 A1    Mar. 24, 2005

(30) Foreign Application Priority Data
Sep. 4, 2003    (DE)    ............................... 103 40 819

(51) Int. Cl.
     *G01M 15/00*      (2006.01)

(52) U.S. Cl. .................................................... 73/116
(58) Field of Classification Search .................. 73/116, 73/117.2, 117.3, 118.1, 119 R
See application file for complete search history.

(56) References Cited

U.S. PATENT DOCUMENTS

| | | | | |
|---|---|---|---|---|
| 5,463,898 | A * | 11/1995 | Blander et al. | .................. 73/116 |
| 5,621,644 | A * | 4/1997 | Carson et al. | ............... 701/102 |
| 6,615,644 | B2 * | 9/2003 | Koo et al. | ................... 73/117.3 |
| 2004/0255886 | A1 * | 12/2004 | Mezger et al. | ........... 123/90.15 |

* cited by examiner

*Primary Examiner*—Eric S McCall
(74) *Attorney, Agent, or Firm*—Kenyon & Kenyon LLP

(57) ABSTRACT

In a method for monitoring a camshaft adjustment of an internal combustion engine in which a setpoint value of an angular position is compared with an actual value of the angular position, a more differentiated fault diagnosis is achieved in that at least two fault types are able to be detected on the basis of the profile of the actual value over time.

10 Claims, 7 Drawing Sheets

METHOD FOR MONITORING A CAMSHAFT ADJUSTMENT OF AN INTERNAL COMBUSTION ENGINE

FIELD OF THE INVENTION

The present invention relates to a method for monitoring a camshaft adjustment of an internal combustion engine in which a setpoint value of an angular position is compared to an actual value of the angular position.

BACKGROUND INFORMATION

Variable valve controls via camshaft adjustment of an internal combustion engine are described in, for example, the essays "Dance of the Valves" and "Variable Valve Control" in the magazine "mot Profi Spezial Variable Ventilsteuerung" [mot Profi Spezial Variable Valve Control], no. 3/2002, Vereinigte Motor-Verlage, Stuttgart.

The camshaft adjustment allows a mechanical variation of the valve trigger times at the intake and discharge channel of a cylinder chamber. The adjustment of the camshaft in the advance or retard direction that is required for this purpose is implemented with the aid of a rotary-vane adjuster, for example, or similar means, via the oil pressure. The oil pressure in the individual chambers is controlled by solenoid valves, which are addressed via a pulse-width modulated signal sent from the control device. In the process, the camshaft must attain the setpoint value with sufficient accuracy within a prescribed period of time. If this is not the case, a malposition is present. Malpositions during variable camshaft adjustment lead to worsening emissions, among others, due to a no longer optimal combustion; they may even result in combustion misses. Furthermore, the driver will complain about a lack of torque or poor output and losses in smooth running such as jerking, which is the result of faulty camshaft positions and the associated charge differences between the cylinder groups.

The diagnosis of the camshaft control is currently performed by checking the angle of adjustment of the camshaft. For this purpose, the amount difference between the setpoint value and the instantaneous value is compared to applicable threshold values. If the threshold values are exceeded or not attained for an applicable period of time, a fault of the camshaft adjustment unit will be set. An adjustment fault of the camshaft is set whenever the instantaneous angular position is outside a permissible tolerance range after the debouncing time has elapsed. A camshaft diagnosis according to the related art is able to diagnose only a general adjustment error of the camshaft.

SUMMARY

An example embodiment of the present invention relates to the problem of allowing a more differentiated fault diagnosis.

In accordance with one example embodiment of the present invention, this problem may be solved by a method for monitoring a camshaft adjustment of an internal combustion engine in which a setpoint value of an angular position is compared to an actual value of the angular position. It is characterized by the fact that at least two fault types are able to be detected on the basis of the profile of the instantaneous value over time. The fault types are subdivided into a first fault type and a second fault type. The first fault type is present when the camshaft adjustment system reacts more slowly than allowed in a worst-case scenario (slow response). The second fault type is present when the camshaft adjustment system fails to react to changes in the setpoint value and is blocked on the way to the setpoint value to be attained (target error).

In a development of the example method, it is provided that the first fault type be considered detected when a stored setpoint value has not been attained with sufficient accuracy after a maximum time duration (duration of first timer=$T_{max1}$). It is advantageous in this context if the first fault type is considered detected when a value range about the setpoint value has not been reached following a maximum time. Instead of requiring that a precise value be reached, it is thus the case that the attaining of a tolerance range is considered sufficient.

In another development of the example method, it is provided that the first fault type be considered detected when, in an already known fault, the actual value has additionally exceeded a fault threshold value.

In a further development of the example method, it is provided that the second fault type be considered detected when the difference of the actual values between the start time and the maximum time has additionally not exceeded a fault threshold value. The start time is the point in time at which a change in the setpoint/actual difference>threshold value has been determined. The maximum time is the time setpoint selection after which the stored setpoint value which has caused the setpoint/actual difference, should actually have been attained with sufficient accuracy. The fault threshold value is a differential value that, when not reached, leads to the assumption that two consecutive measured values of the angular position—this may be a comparison of two actual values or a comparison of the actual value to a setpoint value—will not show a noticeable difference between the two values.

In another development of the example method, it is provided that the setpoint value of the angular position be stored as before at the beginning of the actuator monitoring. The beginning of the actuator monitoring is started when the difference between the setpoint value and actual value exceeds a minimum value. A test cycle is always started with a sufficiently large setpoint/actual difference.

In another development of the example method, it is provided that the actual value of the angular position be stored at the beginning of the actuator monitoring. For the further evaluation by means of a diagnosis system, the stored actual value and stored setpoint value will thus be available.

In another development of the example method, it is provided that the extreme value of the actual value of the angular position be stored while the maximum time is running (duration of second timer=$t_{max2}$). By this measure, all fault values or diagnosis values are available for the further automated evaluation with the aid of a diagnosis system.

The problem mentioned in the introduction may also be solved by an internal combustion engine having a device for monitoring a camshaft adjustment which is able to operate according to a method as recited in one of the method-directed claims.

BRIEF DESCRIPTION OF THE DRAWINGS

An exemplary embodiment of the present invention described in greater detail below on the basis of the associated figures.

DETAILED DESCRIPTION OF EXAMPLE EMBODIMENTS

Figure 1:
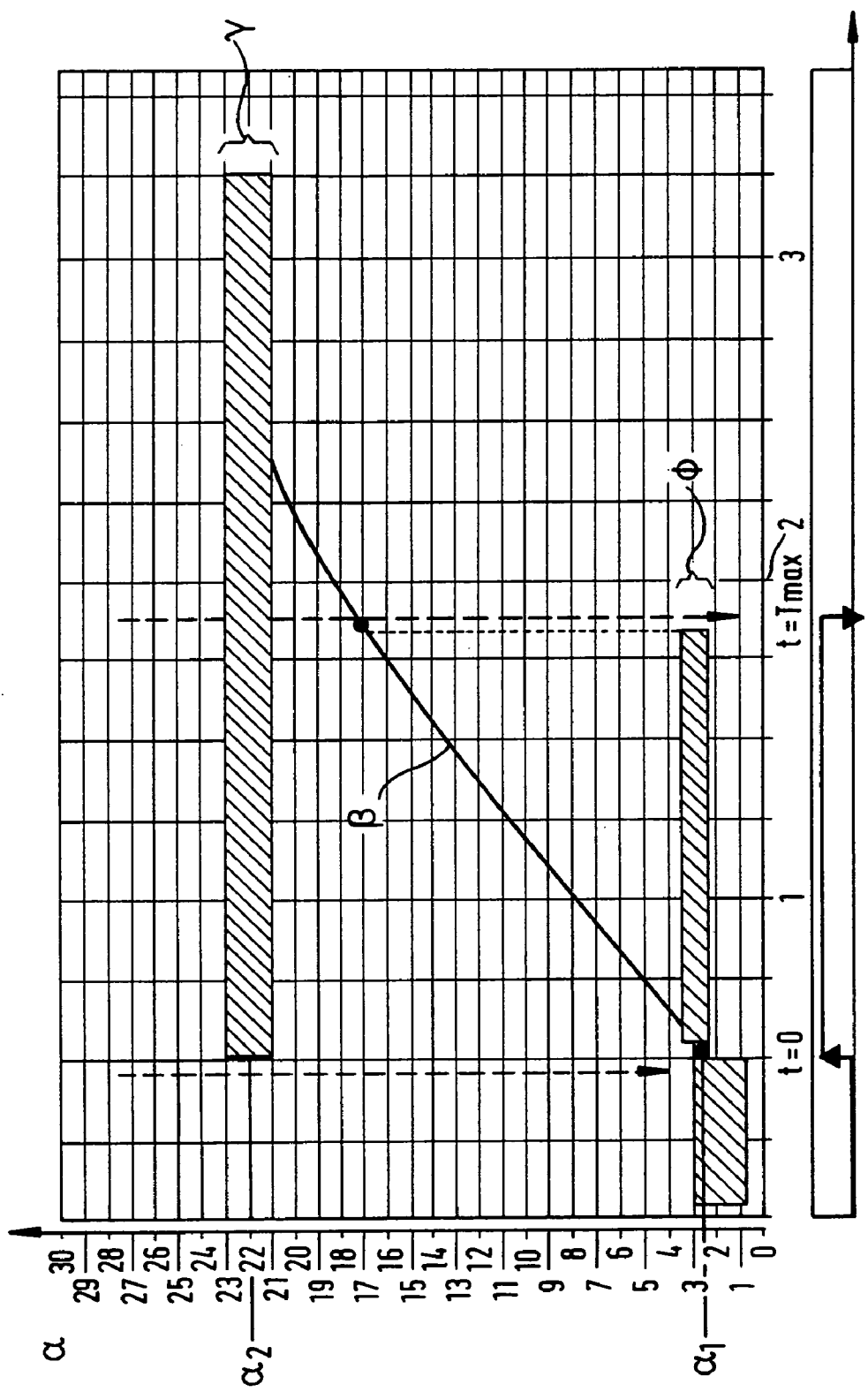
FIG. 1 shows a first diagram of an angular position over time showing a first fault type with a step-type camshaft adjustment.

FIG. 1 shows a relative angular position $\alpha$ over time t. Relative angular position $\alpha$ represents the relative rotation of the camshaft with respect to a basic position. Shown in each case are setpoint values $\alpha$ and an actual value $\beta$. A setpoint $\alpha_1$ is specified up to a time t=0; starting with time t=0, a setpoint $\alpha_2$ is specified. FIG. 1 illustrates the time characteristic of actual value $\beta$ over time t. The change in the specified setpoint value, from $\alpha_1$ to $\alpha_2$, has an essentially abrupt profile; the actual adjustment of actual value $\beta$ cannot be carried out abruptly. A tolerance range $\gamma$ is defined about setpoint value $\alpha_2$, and, accordingly, a tolerance range $\phi$ is defined about setpoint value $\alpha_1$. If actual angle $\beta$ is within tolerance ranges $\gamma$ or $\phi$, it will be assumed that the particular setpoint value has been attained. In the jump illustrated in FIG. 1, from setpoint value $\alpha_1$ to setpoint value $\alpha_2$ at time t=0, the time duration that actual angle $\beta$ requires as actuating time to reach range $\gamma$ about setpoint angle $\alpha_2$ will then be determined. If tolerance range $\gamma$ is not reached at time $t=T_{max}$, a fault is present. In the case at hand, actual angle $\beta$ is outside of both tolerance ranges $\gamma$ and $\phi$; instantaneous angle $\beta$ has changed in the direction of setpoint angle $\alpha_2$.

Decisive is a sufficiently large setpoint-value change which establishes time t=0. At time t=0, the instantaneous, unfiltered actual angle is viewed and this angle stored in a RAM cell. If the adjustment system is unable to attain the specified setpoint value within a predefined time, a fault time counter having a timeout equal to $T_{max}$ is running, and the actual instantaneous angle is viewed once again at this point in time and stored in a second RAM cell. At time $t=T_{max}$, these two actual angles are subtracted from one another and the absolute value of this difference is compared to fault range $\phi$. If the determined actual-value differential is greater than this threshold, a preceding adjustment was determined, so that a so-called "slow response" behavior of the fault is detected since the adjustment system was unable to attain the setpoint value within the specified time.

Figure 2:
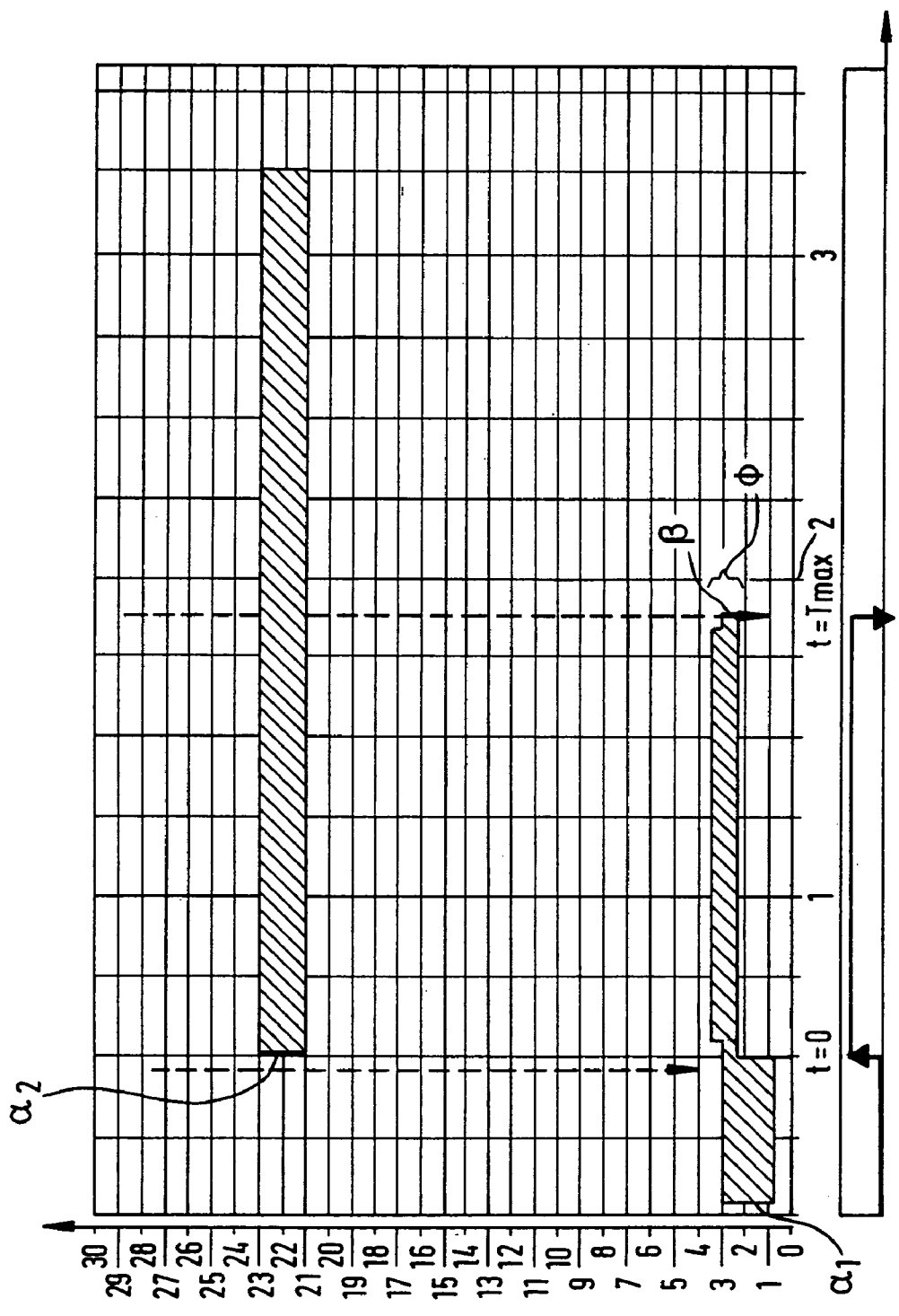
FIG. 2 shows a representation according to FIG. 1 in a second fault type.

FIG. 2 shows a second fault, which is designated "target error". In this case, the entire system is unable to leave tolerance range $\phi$ about angle $\alpha_1$. As before, the read-in actual angle values are subtracted from one another at time t=0 and $t=T_{max}$. If the absolute value is smaller than the target error fault threshold, namely tolerance range $\phi$, no preceding adjustment was determined and a target error was therefore detected at the time of timeout $t=T_{max}$ and entered in an associated fault memory.

Figure 3:
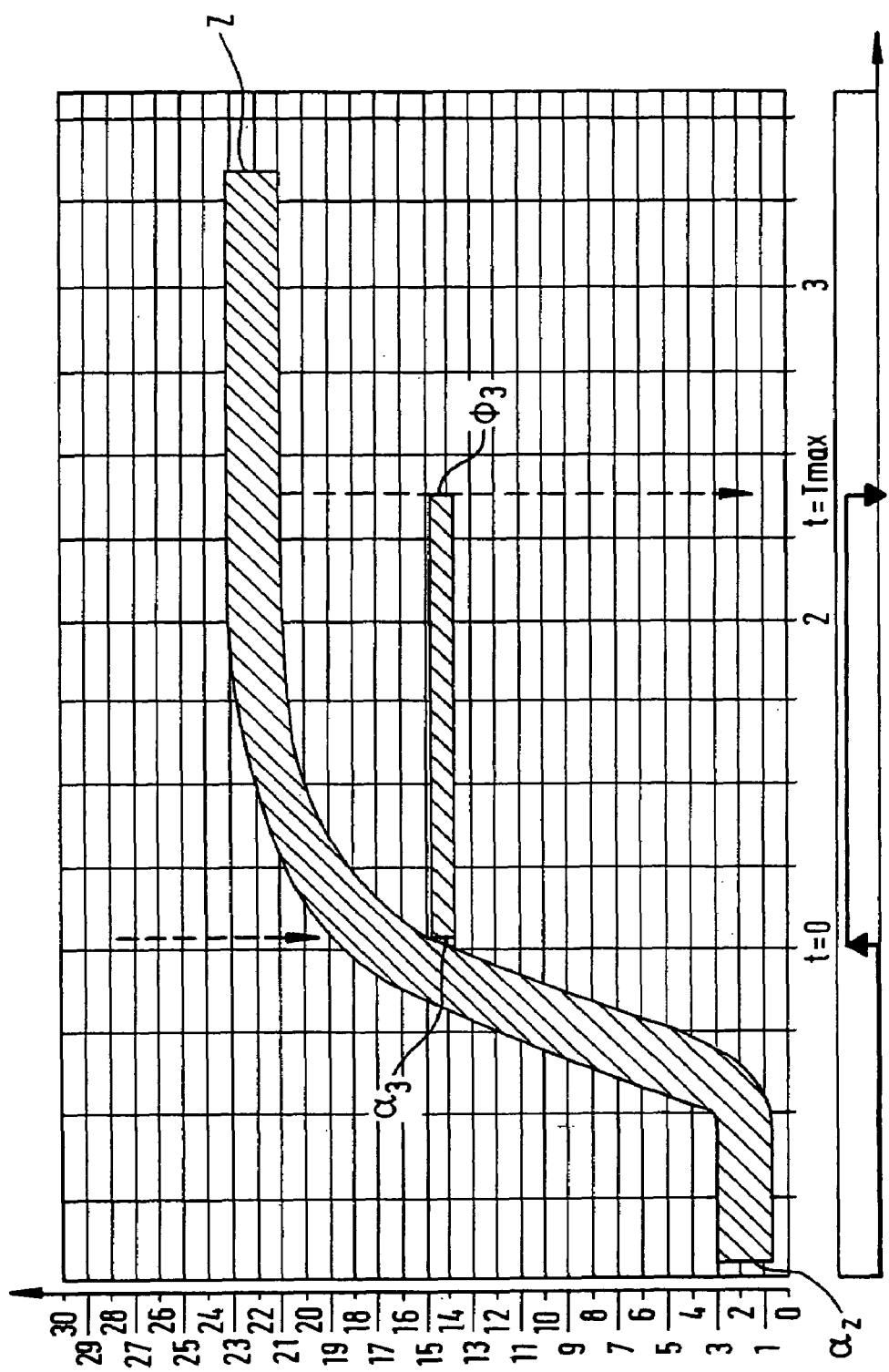
FIG. 3 shows a representation according to FIG. 1 in a third fault type.

FIG. 3 shows an additional fault case in which the adjustment system is initially able to adjust the camshaft with sufficient speed, but the camshaft then abruptly gets stuck on the way to setpoint value $\alpha_2$. To be able to detect this case as well, the setpoint-value filter is adapted to a midposition actuator. This means that the actuator monitor will not respond as long as the actual value is within an allowed range Z. The setpoint value, which is filtered and expanded by a tolerance range Z, is denoted by $\alpha_z$ in FIG. 3. If actual value $\beta$ is within the range specified by $\alpha_z$, the entire adjustment system operates in a fault-free manner. If actual value $\beta$ strays from setpoint-value range $\alpha_z$, the fault counter will be activated. In the representation according to FIG. 3, this is the case at time t=0. Similarly to the representations of FIG. 1 and FIG. 2, a tolerance range $\phi_3$ is now defined about setpoint value $\alpha_3$ specified at time t=0. If this tolerance range $\phi_3$ has not been left by time $t=T_{max}$, another target error is present, i.e., the second fault type. If tolerance range $\phi_3$ is left by time $t=T_{max}$, yet tolerance range $\alpha_z$ is not attained, another slow response fault is present.

Figure 4:
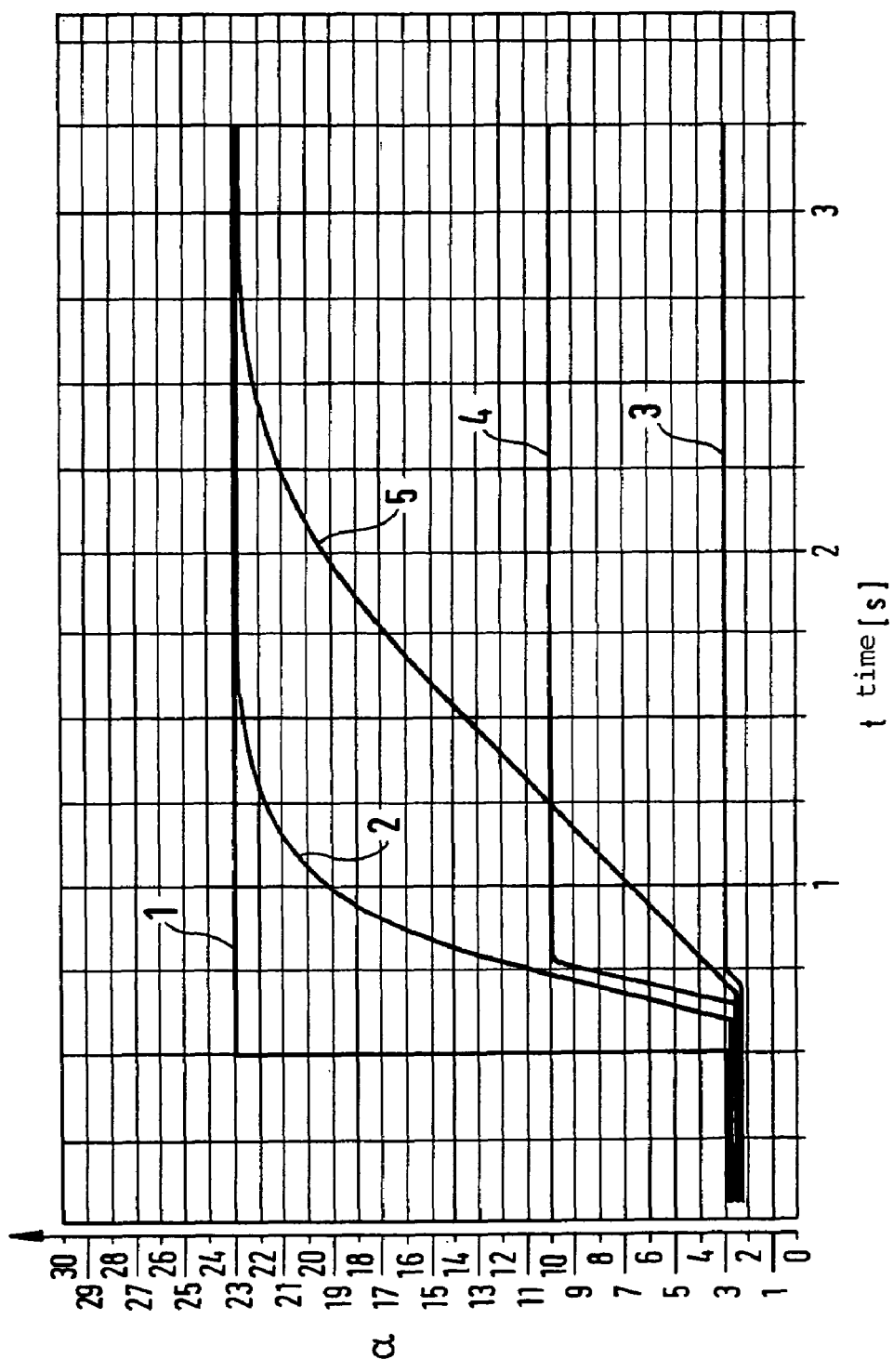
FIG. 4 shows a representation according to FIG. 1 in a plurality of fault types.

FIG. 4 shows the possible fault types once again, in the form of a diagram summary. Here, too, adjustment angle $\alpha$ is shown over time t. Curve 1 corresponds to the setpoint specification. Curve 2 shows the fault-free profile. Curves 3 and 4 show the first fault case, which is referred to as "target error". In curve 3 the lower tolerance range $\phi$ is not even left; in curve 4 it is left, but the second fault case occurs after a short period of fault-free adjustment. Curve 5 represents the first fault case, which is denoted as "slow response".

Figure 5:
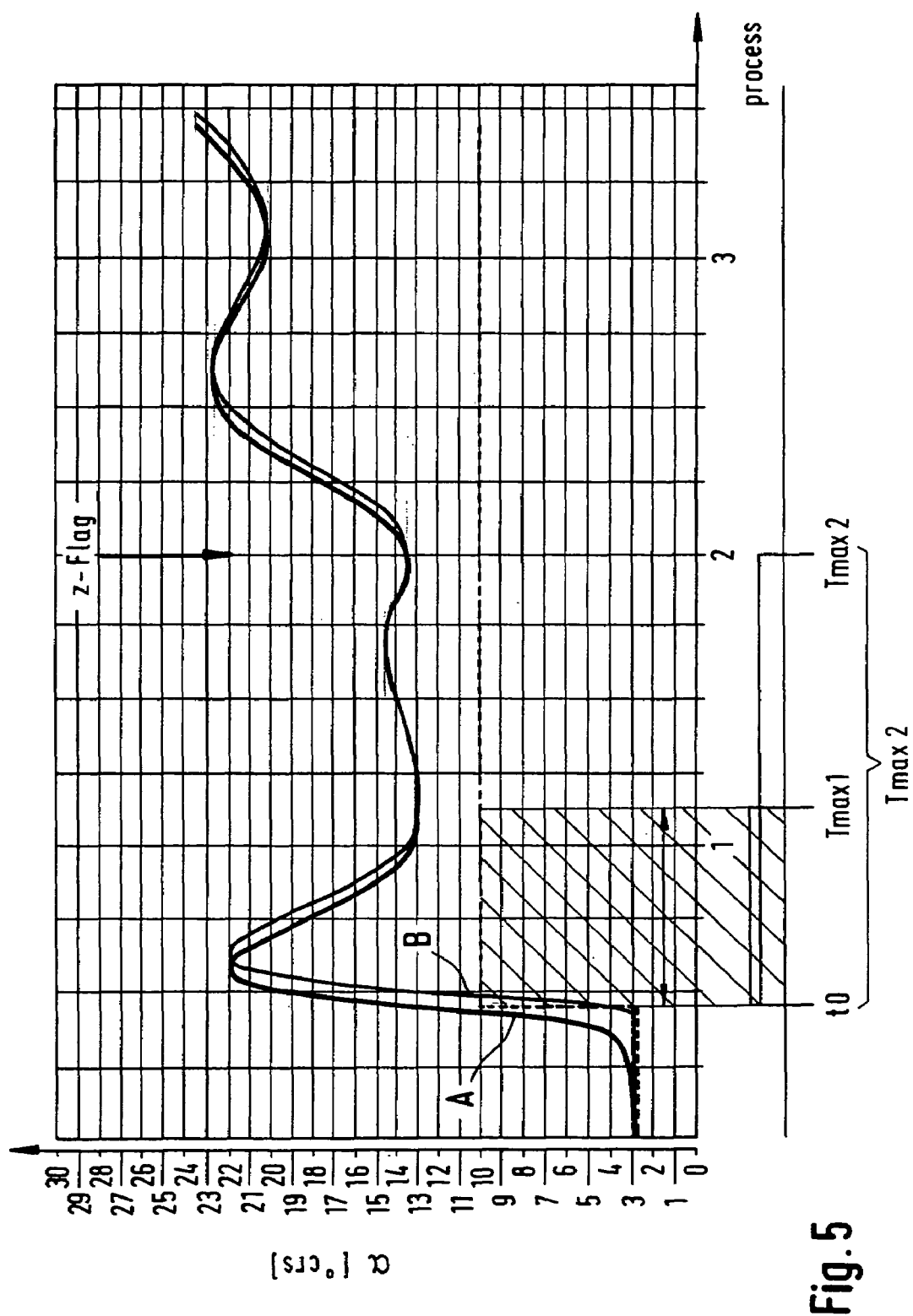
FIG. 5 shows a diagram of an angular position over time in a continuous camshaft adjustment and two-part time measurement in the fault-free case.
Figure 6:
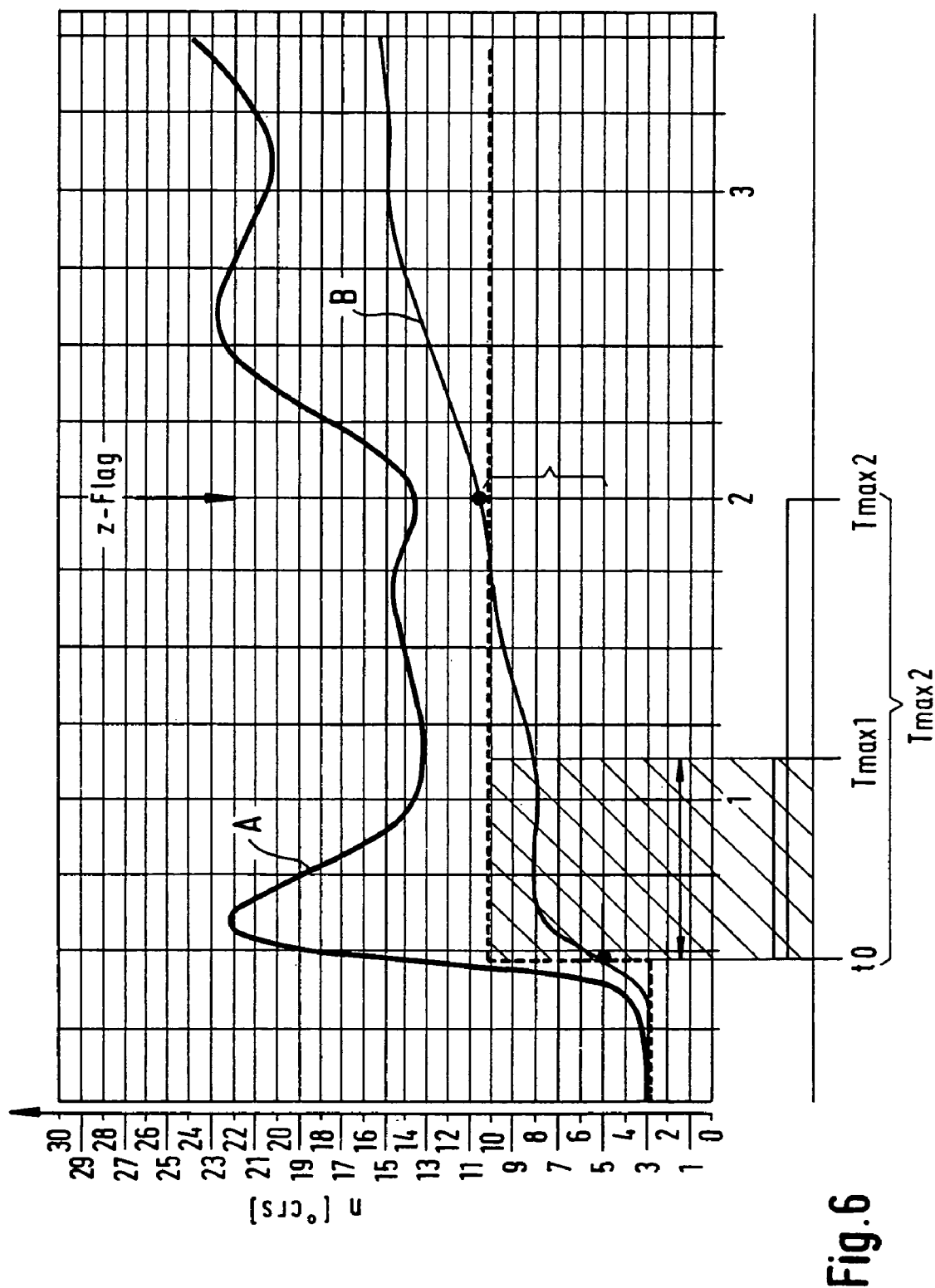
FIG. 6 shows a representation according to FIG. 5 in a first fault.
Figure 7:
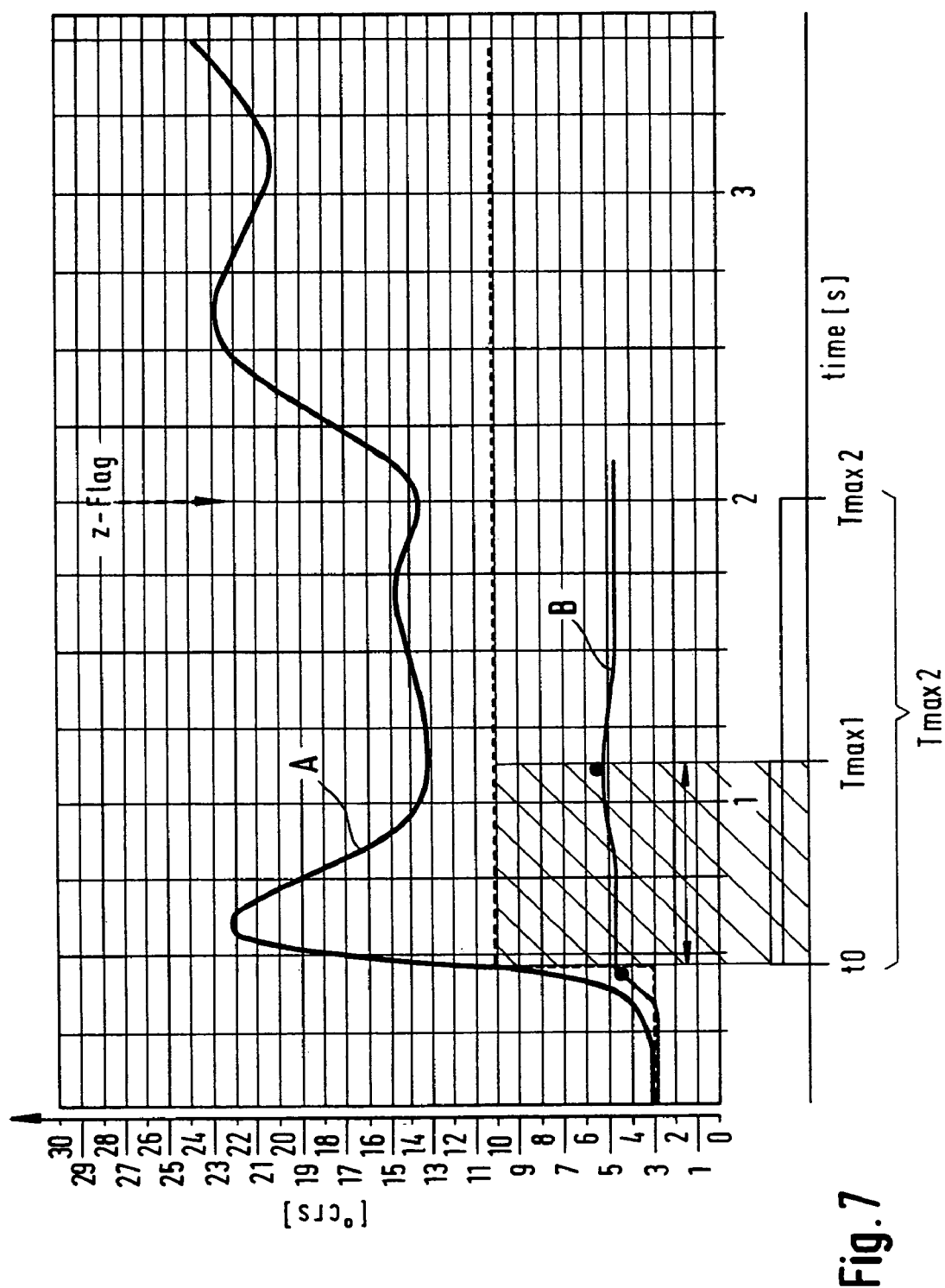
FIG. 7 shows a representation according to FIG. 5 in a second fault.

FIG. 5 shows a representation according to FIG. 1, i.e., a relative angular position $\alpha$ over time T as well. In contrast to the first specific development of the method according to the present invention as illustrated in FIGS. 1 through 4, the time-measurement periods are split into two parts here. Shown is a setpoint value curve A and an actual value curve B. If it is determined at time $T=T_0$ that setpoint value A deviates from actual value B, at least one first timer will be started and the relative deviations $\Delta AB=A-B$ be measured until time $T=T_1$. If deviation $\Delta AB$ has dropped below a threshold value by this time, a fault-free case exists. If deviation $\Delta AB$ has not dropped below a threshold value by that time, a fault case is present as illustrated in FIGS. 6 and 7. The type of fault will then be determined within a second time-measurement period up to time $T_{max2}$. That is to say, within the first time-measurement period up to time $T_{max1}$, it is ascertained only whether a fault exists; within the second time-measurement period up to time $T_{max2}$, the type of fault will then be ascertained. Shown in FIG. 6 by way of example is the "slow response" fault in which the setpoint value is indeed not attained, but a range about the initial value is left. FIG. 7 illustrates the case of a target fault in which a range about the initial value is never even left. In essence, the second exemplary embodiment of the method according to the present invention as shown in FIGS. 5 through 7 differs from the first exemplary embodiment only in that the time-measurement period has been divided into two parts, $T_{max1}$ and $T_{max2}$.

The camshaft control is thus monitored by a comparison of the actual value and the setpoint value of the camshaft adjustment angles. For this purpose, the operational sign-dependent differential between setpoint value and the actual value is compared to a threshold value which is a function of the oil temperature and rotational speed. The example method according to the present invention combines the two possible adjustment types of a switched camshaft adjustment—having only two possible actuating positions —and a continuous camshaft adjustment. If the camshaft is unable to compensate for the angular range produced by a sufficiently large change in the setpoint value within a prescribed adjustment time $T_{max1}$, a fault of the camshaft adjustment unit will be set. The example method according to the present invention, which runs in parallel thereto, determines whether this fault characteristic is a target error or a slow response characteristic.

After adjustment time $T_{max1}$ to be observed has elapsed, it is ascertained whether the camshaft actuator was able during this time to compensate for the setpoint/actual difference given at the beginning of the test cycle. If the actual-angle differential of the camshaft, between the actual angle stored at the onset of monitoring and the extreme value, is less than a predefined threshold value during the entire diagnosis duration, the diagnosed fault characteristic is a target error. In the event that the difference is greater than a threshold value, it is assumed that the camshaft is still adjusting, and a "slow response" characteristic is entered as fault.

What is claimed is:

1. A method for monitoring a camshaft adjustment of an internal combustion engine, comprising:
    adjusting an actual value of an angular position of the camshaft to a new setpoint value being initiated by a change in a specified setpoint value;
    comparing the actual value to the new setpoint value, wherein, in the event of a change in the specified setpoint value, the actual value of the angular position is determined; and
    detecting at least two fault types based on a profile of the actual value over time.

2. The method as recited in claim 1, wherein the detecting step includes detecting a first fault type when the actual value has exceeded a fault threshold value in an already known fault.

3. The method as recited in claim 1, further comprising:
    storing the new setpoint value of the angular position at the beginning of actuator monitoring.

4. The method as recited in claim 1, further comprising:
    starting actuator monitoring only when the difference between the new setpoint value and actual value exceeds a minimum value.

5. The method as recited in claim 1, further comprising:
    storing the actual value of the angular position at a beginning of actuator monitoring.

6. The method as recited in claim 1, further comprising:
    storing an extreme value of the actual value of the angular position at a maximum time.

7. The method as recited in claim 1, wherein the detecting step includes detecting a first fault type when a stored setpoint value has not been attained with sufficient accuracy following a maximum time.

8. The method as recited in claim 7, wherein the detecting step further includes detecting the first fault type when a value range about the new setpoint value has not been attained following a second maximum time.

9. The method as recited in claim 7, wherein the detecting step further includes detecting a second fault type when the difference of actual values, between an onset time (t=0) and the maximum time, has not exceeded a fault threshold value.

10. An internal combustion engine, comprising:
    a device to monitor a camshaft adjustment, the device configured to compare a setpoint value of an angular position to an actual value of the angular position of the camshaft, and configured to detect at least two fault types based on a profile of the actual value over time.

* * * * *